United States Patent
Klingels et al.

(10) Patent No.: US 10,393,160 B2
(45) Date of Patent: Aug. 27, 2019

(54) OBLIQUE FLANGE CHANNEL

(71) Applicant: MTU Aero Engines AG, Munich (DE)

(72) Inventors: Hermann Klingels, Dachau (DE);
Wolfgang Bickmeier, Petershausen (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 15/919,781

(22) Filed: Mar. 13, 2018

(65) Prior Publication Data

US 2018/0266464 A1    Sep. 20, 2018

(30) Foreign Application Priority Data

Mar. 17, 2017  (DE) .................. 10 2017 204 539

(51) Int. Cl.
| | | |
|---|---|---|
| *F16B 5/02* | (2006.01) | |
| *F16B 37/12* | (2006.01) | |
| *F01D 25/24* | (2006.01) | |
| *F16B 13/06* | (2006.01) | |
| *F01D 25/26* | (2006.01) | |
| *F16L 23/02* | (2006.01) | |

(52) U.S. Cl.
CPC .......... *F16B 5/0241* (2013.01); *F01D 25/243* (2013.01); *F16B 13/06* (2013.01); *F16B 37/122* (2013.01); *F01D 25/26* (2013.01); *F05D 2260/30* (2013.01); *F05D 2260/31* (2013.01); *F16L 23/02* (2013.01)

(58) Field of Classification Search
CPC .............. Y10T 403/64; Y10T 403/642; Y10T 403/645; F01D 25/24; F01D 25/243; F16J 13/02
See application file for complete search history.

(56) References Cited

U.S. PATENT DOCUMENTS 2,452,227 A    10/1948  Dahlstrand

FOREIGN PATENT DOCUMENTS

| DE | 1217711 B | 5/1966 |
|---|---|---|
| DE | 19728779 A1 | 1/1999 |
| DE | 60037858 T2 | 1/2009 |
| EP | 0368106 A2 | 10/1989 |

(Continued)

OTHER PUBLICATIONS

Machine Translation of DE1217711, http://translationportal.epo.org, created Jan. 8, 2019.*

(Continued)

*Primary Examiner* — Daniel J Wiley

(74) *Attorney, Agent, or Firm* — Barlow, Josephs & Holmes, Ltd.

(57) ABSTRACT

Disclosed is a component with a component section and a flange that is arranged at the component section for connection of the component another element. Arranged at the flange is one or a plurality of oblique flange channels, that is, channels for respectively accommodating a section of a connection element that runs obliquely to a surface portion of the component section that lies opposite to the flange. Further disclosed is a flange connection with at least one component of this kind, another component, and at least one connection element. Disclosed, in addition, is a turbomachine with a housing that is assembled from two or more components by means of such a flange connection.

18 Claims, 2 Drawing Sheets

(56) References Cited

FOREIGN PATENT DOCUMENTS

| EP | 0493667 A1 | 7/1992 |
| EP | 0889277 A1 | 1/1999 |
| EP | 1162347 A1 | 12/2001 |
| EP | 2048423 A1 | 4/2009 |

OTHER PUBLICATIONS

Schaeffler Technologies AG & Co. KG, "Geteilte Stehlagergehause SNS" (translation: Split plummer block housings SNS), Issue 2016, March.

\* cited by examiner

OBLIQUE FLANGE CHANNEL

BACKGROUND OF THE INVENTION

The present invention relates to a component with a component section and a flange that is arranged on it for connection of the component to another element. The invention further relates to a flange connection of at least one component of this kind with another component as well as to a turbomachine (in particular a compressor or a turbine) with a (e.g., longitudinally divided) housing, which is assembled from two or more components by a flange connection.

A flange serves for tight connection of components (e.g., pipes, machine parts, and/or housing elements). The connection of flanges by elements such as bolts, screws, and/or nuts is hereby usually reversible without any destruction. Besides the positioning of the components with respect to one another, the function of a flange is often also the transmission of operating forces.

Among other things, individual housings of turbomachines are usually positioned with respect to one another by flange connections. In this case, the respective engine axis is normally perpendicular to the flange plane. The individual housings can be assembled, in turn, from different parts, which, in turn, can be connected by flanges. For example, various compressor housings, combustion chamber housings, and also turbine housings that are composed of half shells are known, with the engine axis then lying in the respective flange plane.

Known from the publication EP 1 162 347 A1 is a connection of housing parts of a steam turbine in which tension elements distributed on the periphery of the housing parts bridge the joint. The tension elements thereby exert a force on elements shaped in the form of radial projections, between which the tension elements are arranged. As a result of this, the parts of the housing are pressed together.

If an assembled housing is under high internal pressure, the respective components are held together by bolting together the connection elements, but it is not possible geometrically to position bolts directly in the flux of force of the surrounding housing shell. Thus, under a (pressure) load, a bending torque is created, which causes a deformation of the housing.

This can result—in particular, at the end faces—in a gaping of the joint. In order to avoid a joint, in particular at the end faces, EP 0 889 277 A1 discloses the use of housing parts that have a housing extension that is surrounded at the outer periphery by a coaxially attached, horizontal undivided ring.

During deformation, a housing fabricated with a constant radius will take on a shape that is oval in cross section. If what is involved, for example, is one or a plurality of housings of a turbomachine (especially of a compressor or a turbine), then the rotor clearance, that is, the gap between the housing and the rotor, is negatively impacted by this oval shape.

In order to avoid these drawbacks, the housings are often fabricated so as not to be round, but, on their part, oval. The deformation that occurs during operation will then compensate for the deviation, such that near roundness is attained. Such a fabrication is tedious and costly, however. In addition, a housing fabricated in this manner is matched to the respectively intended extent of the deformation and is therefore not optimized for flexible utilization.

SUMMARY OF THE INVENTION

The object of the present invention is to provide a technology by which one component can be connected to another element with the reduction or even avoidance altogether of detrimental load-induced deformations. In particular, the object of the invention is to make possible a connection of parts of a housing by which oval deformation of the housing is reduced or prevented to the greatest extent possible under operating conditions.

The object is achieved by a component, a flange connection, and a turbomachine of the present invention. Advantageous embodiments are disclosed in the claims, the description, and the drawings herein.

A component according to the invention has a component section with a flange arranged on it that serves for a connection of the component with another element; for example, the component and/or the other element can each be parts of a casing, a pipe, or a horizontally (therefore, longitudinally, that is, axially in relation to a rotor axis) or vertically (therefore, transversely, that is, radially in relation to the rotor axis) divided housing of a turbomachine (in particular of a compressor or a turbine).

In a preferred embodiment, the component according to the invention is a housing part that delimits the hot-gas duct, in particular radially outward. Preferably, the flange and the housing part are thereby formed as a common piece and are constructed integrally with each other; that is, they transition into each other without a joint connection or are joined to each other in a material-bonded or cohesive manner—for instance, by welding.

At the flange, which can be formed at an angle to the component section and/or can be formed so as to arch out of or project out of it, one or a plurality of channels is or are formed, each of which accommodates a section of a connection element; it is thus possible for a connection element of this kind (which can be, for example, a screw, a bolt, or a pin) to be inserted at least partially into or all the way through the channel. The channel or at least one of the channels (which can be formed in flanges bounding the component section) runs obliquely (that is, in an inclined manner) with respect to a surface portion of the component section that lies opposite to the flange (in particular, therefore, on a side that lies opposite to the flange). A surface portion of the component section that lies opposite to the flange can be, in particular, a surface portion whose surface normals are parallel to a support surface area or flange support surface area of the flange in question.

The channel or at least one of the channels is thereby preferably spaced apart from the surface portion; on account of the oblique arrangement, a geometric, abstract extension of one end of the channel (or the central axis thereof) accordingly intersects a corresponding extension of the surface portion (or a tangential plane to it). Starting from a provided support surface area of the component (for resting against a surface of the other element), it is possible for a channel of this kind to lead into the flange or even pass all the way through the flange and thereby—on account of the obliqueness—approach the surface portion or lead away from it.

A flange connection according to the invention comprises at least two components, at least one of which is formed in accordance with an embodiment of a component according to the invention disclosed in this document. The flange connection comprises, in addition, at least one connection element, a section of which is passed or can be passed into or through the channel or into or through at least one of the channels for fastening the components to one another. In particular, the phrase "flange connection" in this document comprises, on the one hand, an embodiment with already connected components and, on the other hand, a variant in the form of an assembly set that still remains to be assembled and in which the components are not yet fastened to one another but are suitable for this purpose.

A component according to the invention or a flange connection according to the invention makes possible a slight expansion of the flange and hence the creation of space. By a connection element passed through or into the oblique channel, it is possible, in addition, to tension the component with the other element at a short distance from the surface portion. In this way, the flange bending torque is markedly reduced in comparison to conventional flange connections (in which the channels run essentially parallel to a surface section lying opposite to the flange). Thus, a high shape stability of the connected parts is achieved.

A turbomachine according to the invention has a housing, which is assembled from two or more components (which, therefore, are then housing parts) by a flange connection according to the invention in accordance with one of the embodiments disclosed in this document. A turbomachine of this kind (which can be a compressor or a turbine) makes possible a simplified fabrication with the reduction or even avoidance of oval deformation of the housing under operating conditions.

The channel or channels are preferably essentially circular cylindrical in form. They can be bored or stamped into the flange or the flange can be created initially with the channels—for example, it can be cast-molded. Regardless of the way in which they are produced, the channels may also be referred to as "bores."

A respective wall of the channels can have a thread, for example, in the form a threaded insert, at least in a partial region, in which a connection element can be screwed. In this way, it is possible to dispense with an outer counterpart element, such as, for example, a nut, which saves space and weight and keeps the connection more compact. In addition, it is possible in this way for the fixation of the connection element to take place in the interior of the component and hence especially near to the mentioned surface portion lying opposite to the flange, thereby reducing or even preventing the connected components from drifting apart under load, and thus bringing about a special stability of the flange connection.

Preferably, along an edge, the surface portion borders a support surface area of the component that is created so as to rest against a surface area of the other element when the component is connected to a (or the) other element. In particular, this support surface area (which can be, at least partially, a surface of the flange) can be at an angle to said surface portion; in a preferred embodiment, the support surface area of the component is essentially perpendicular to the surface portion: This makes possible a symmetry of the flange connection formed from the component and the other element.

The channel or the at least one channel runs preferably at an inclination to a support surface area of the component, for example, with an inclination angle (as the smaller of two plumb-line angles of a central axis of the channel on the support surface area) between 15° and 75°, preferably between 35° and 55°.

In an advantageous embodiment of a component according to the invention, said component comprises at least two channels that are at different inclinations from one another to the surface portion and approach said component at different angles, for example. The direction of a first of the two channels can be pivoted, in particular with respect to the direction of the second of the two channels, preferably around an axis that (for example, in a region between the connection elements) runs along a or the support surface area of the component (for resting against a surface of the other element). The differently inclined channels make possible an especially tight arrangement of connection elements and hence an especially solid flange connection.

An embodiment variant is advantageous in which, at an opening, the channel or at least one of the channels has a countersink for at least partial accommodation of a head of a (or of the) connection element, for whose accommodation the channel is furnished—for example, a head of a corresponding screw or of a corresponding bolt. In this way, the flange connection can be especially compact in construction. A reinforcing crosspiece is preferably arranged between at least two adjacent or between each two adjacent countersinks. As a result of this, an especially high stability of the flange connection can be achieved.

In a preferred embodiment of a component according to the invention, the one channel or at least one of the plurality of channels is created in the form of a (preferably, essentially circular cylindrically formed) blind hole with an entry and a channel end (which can be defined by a channel end surface area lying opposite to the entry) arranged in the interior of the component. Preferably, in at least a partial region, a channel of this kind has a thread or a receiver for a threaded insert, in which a connection element can be screwed, and/or a passage running at an angle to the channel at an outer surface area of the component; such a passage is then preferably created for accommodating a pin (which then can preferably be inserted through a corresponding hole in the connection element) for fixation of the connection element in the channel.

An embodiment is advantageous in which the one or at least one of the plurality of channels cross through the component; a part of a channel of this kind can thereby itself lead through the component section. A channel of this kind therefore forms a perforation (with an entry hole and an exit hole). Thus, it can form a passage for a connection element; at the side of the exit hole, it is possible for an inserted connection element to enter preferably into a channel of the other element; this channel, on its part, can be formed as a perforation or as a blind hole with an entry and a channel end arranged in the interior of the other element.

In accordance therewith, an advantageous embodiment of a flange connection according to the invention comprises a first component, for which the channel or at least one of the channels crosses through the component, and a second component, for which the channel is formed as a blind hole, as well as at least one connection element, which is or can be introduced (for example, screwed) through the crossing channel of the first element into the channel that is formed as a blind hole. In the blind hole, the connection element can preferably be fixed in place and thus bring about a tensioning of the components by, for example, threads in the blind hole and on the connection element or by a pin and an associated hole in the connection element (as described above).

In accordance with an advantageous embodiment, at least one and preferably a plurality of, in particular all, connection elements, are designed as an expansion bolt. Along their longitudinally extending axis, expansion bolts have a certain degree of elasticity and, when used appropriately in the screwed-in state, produce a restoring force, which counters any loosening due to vibrations or the like, for instance. In this way, maintenance and inspection costs can be reduced.

In accordance with another advantageous further development, a sleeve is inserted between the head of the expansion bolts and the channel or the component; the respective expansion bolt extends through this sleeve and thus enables the use of longer bolts. This makes possible a greater expansion length and a higher expansion potential.

Especially preferred is an embodiment of a component according to the invention that has both at least one (first) channel, formed as a blind hole as described above, and at least one (second) channel crossing through the component. Together with another correspondingly formed element, it is thereby possible to create a symmetrical and therefore especially solid flange connection. Preferably, in this case, the directions of the first channel and the second channel of the component differ from each other; the direction of the first channel can be, for example, pivoted with respect to the direction of the second of the two channels around an axis that runs along a support surface area of the component.

A preferred flange connection according to the invention comprises a first and a second component, for which the at least one channel or at least one of the channels crosses through the respective component in each case. The two components are thereby connected or will be connected to each other in such a way that, between two channels that are adjacent along the flange and cross through the first component, a channel that is offset (namely, into the second component) is arranged or will be arranged relative thereto and crosses through the second of the components. In this way, therefore, it is possible for connection elements to be passed through or become passed through the respective channels (e.g., screwed in) preferably alternately along the flange from both sides. An arrangement of this kind makes possible an especially high density of connection elements, because they are utilized or can be utilized at a small spacing from one another from different sides. As a result of this, a high stability of the connection can be achieved. In particular, the two components with their channels can be arranged at least in sections in accordance with a glide reflection, with the support surface areas of the components preferably constituting the mirror planes.

BRIEF DESCRIPTION OF THE DRAWING FIGURES

In the following, preferred exemplary embodiments of the invention will be discussed in detail on the basis of drawings. It is understood that individual elements and components can also be combined differently than represented here. Reference numbers of elements that correspond to each other are used for all figures and are not described anew for each figure.

Shown schematically:

DESCRIPTION OF THE INVENTION

Figure 1:
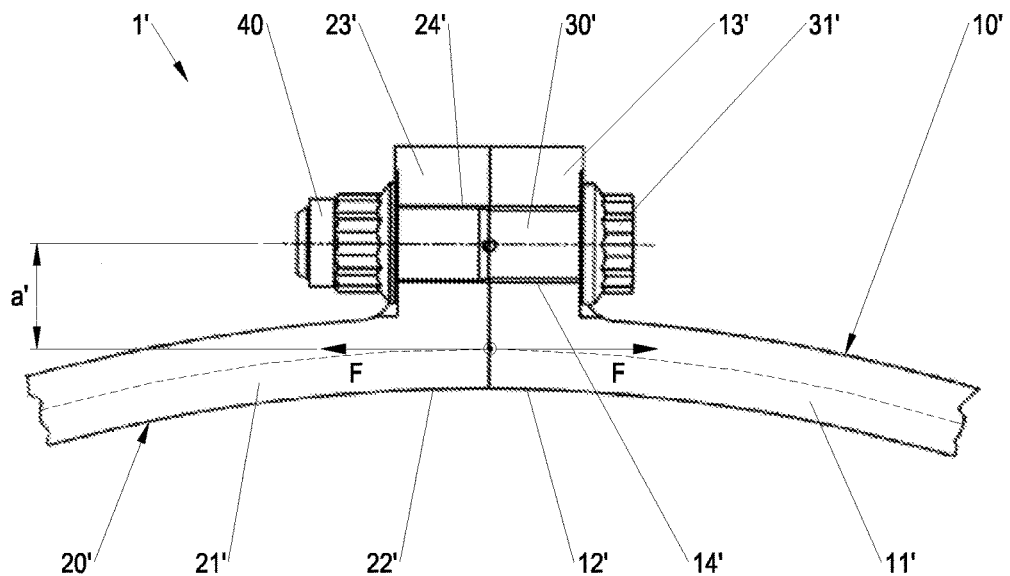
FIG. 1 is a conventional flange connection consisting of two components in a sectional illustration.

FIG. 1 shows schematically an example of a flange connection 1' known from the prior art in a sectional illustration. The two components 10', 20', which, in particular, can be housing parts (for example, housing halves) of a turbomachine, each have a component section 11', 21' with a surface portion 12', 22', opposite to which (that is, opposite-lying) is arranged a flange 13', 23' in each case.

The flanges are each crossed by a channel 14', 24', which (or the passage channel of which) runs in a plane that is essentially parallel to the respective surface portion 12', 22' (or to a tangential plane of these surface portions).

The components 10', 20' are arranged with respect to each other in such a way that each of the channels 14', 24' extends the other. Passing through both of them is a common connection element 30', which, in this case, is a bolt and has a head 31', onto which a nut 40' is screwed. The flange connection 1' is held together by tensioning the head 31' and nut 40' against each other.

During operation of a turbomachine having housing parts that are connected in this way, the high internal pressure produces forces F that act in opposing directions on the construction and housing parts 10', 20'. Although the flange connection shown can hold together the components, it is not possible geometrically to position the bolt directly in the flux of force of the surrounding housing shell: The distance between the central axis of the connection element and the mean wall thickness of the surrounding housing, indicated by a' in FIG. 1, produces, in interplay with the forces F, a bending torque at the transition of the component sections 11', 21' into the flange. As a result of this bending torque, the housing deforms, for which reason the above-described drawbacks ensue.

Figure 2:
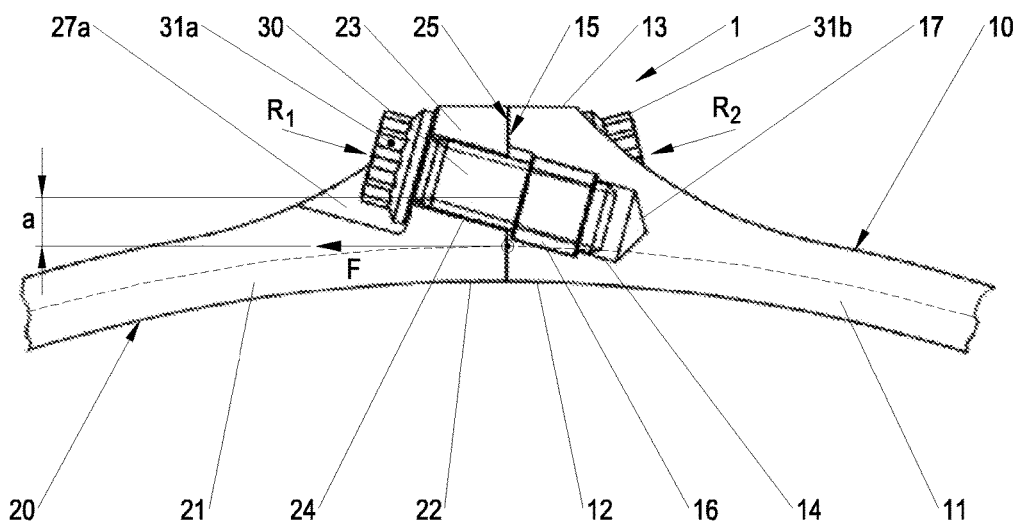
FIG. 2 is a flange connection in accordance with an exemplary embodiment of the present invention in a sectional illustration.

In contrast, in FIG. 2, a section through a flange connection 1 according to the invention is shown schematically. Said flange connection comprises two components 10, 20 according to the invention and a plurality of connection elements 30, each of which is formed as a bolt with a head $31a$, $31b$. The two components 10, 20 each have a component section 11, 21 with a surface portion 12, 22, opposite to which (that is, opposite-lying) a flange 13, 23 is arranged.

The flanges each have a plurality of channels, of which, in the sectional illustration, only the channels 14, 24 can be seen. In this case, the channel 14 is constructed in the form of a blind hole with an entry (arranged facing the component 20) and a channel end 17, which is formed opposite to the entry in the interior of the component 10. Inserted into the channel 14 is a threaded insert 16, into which an end of the connection element 30 that is opposite to the head $31a$ is screwed. By contrast, the channel 24 crosses through the component 20, which has a countersink $27a$ for the head $31a$.

The two components 10, 20, which, like those of FIG. 1, in particular, can be housing parts (for example, housing halves) of a turbomachine, are arranged resting against each other at the respective support surface areas 15, 25 in the illustrated flange connection. The connection element 30 is thus inserted into the channels 14, 24, which extend each other and lie in succession.

Both channels 14, 24 run obliquely with respect to the respective surface portion 12, 22 of the associated components 10, 20 that lies opposite to the flange 13 or 23, respectively. The surface portions 12, 22 can thus each be adjacent, in particular,—such as is illustrated in FIG. 2—to a support surface area 15 or 25 and can each have a surface normal that runs perpendicular to the surface normal of the respective support surface area 15 or 25. The surface portions 12, 22 can be, in particular, also very small, so that any curvature can be neglected. The distance of each channel 14, 24 from the surface portion 12, 22 hereby decreases in the channel direction $R_1$. The connection element 30 therefore protrudes into the component section 11 of the component 10, so that the tensioning occurs at a short distance from the surface portions and hence also with respect to the mean wall thickness of the component sections 11, 21; this is indicated in FIG. 2 by the distance a. The vicinity of the tensioning to the surface portions 12, 22 brings about a reduced bending torque and hence an improved shape stability of the connection under operating loads. In addition, in this way, the flanges can have a small, in particular radial, expansion, which makes possible the compactness of the flange connection shown.

In another embodiment, which is not shown and differs from the embodiment of FIG. 2, the two channels 14, 24 each run perpendicularly to the respective support surface area 15 or 25 and the surface normals of the support surface areas 15, 25 each run obliquely to the respective surface portion 12 or 22. In other words, the surface normals of the surface portions 12, 22 do not run parallel to the respective support area 15 or 25. Although, as a result of this, it is possible to screw only from one side, it can be advantageous for production of the channels 14, 24 by boring, for example, and it also can be advantageous for assembly.

Also seen in FIG. 2 is another connection element, which, in the direction of view of the figure, is arranged behind the connection element 30 and of which only the head 31b can be seen. This connection element is inserted, in analogy to the connection element shown, from the other side into the associated channels of the components 10, 20. In this case, a channel formed in the component 20 (not illustrated in the figure, but to be inferred from it) is formed as a blind hole with a threaded insert; this channel extends a channel that crosses the component 10. These channels each have a channel direction $R_2$ that is pivoted around an axis with respect to the direction $R_1$ of the channels 14, 24, which run in a region between the connection elements along the support surface areas 15, 25 of the components.

Figure 3:
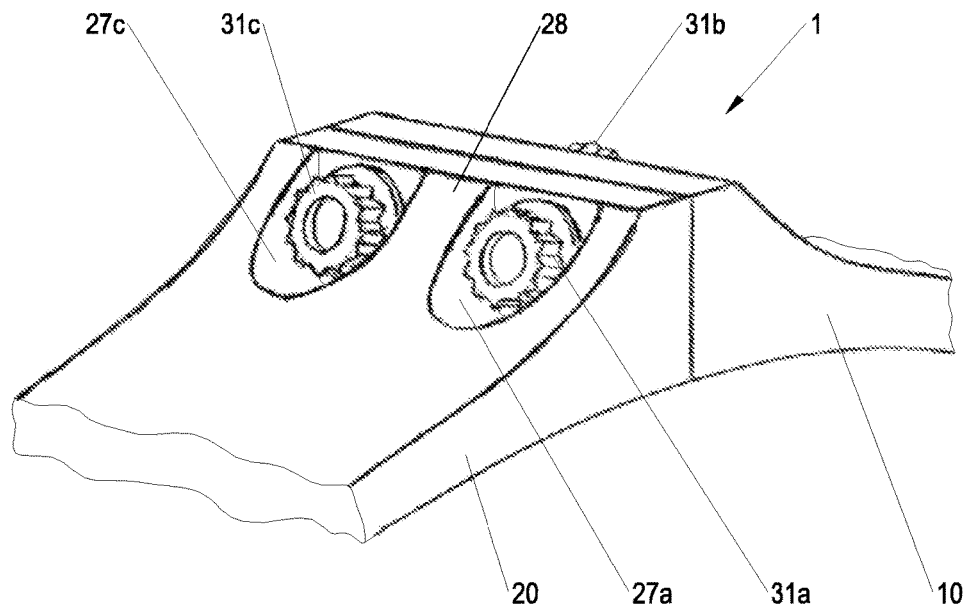
FIG. 3 is a section of the flange connection of FIG. 2 in perspective view.

Preferably, in a corresponding way, additional channels are arranged in alternation in the components 10, 20, for example, alternately parallel to one another or pivoted against each other; this is shown for a total of three channels by way of example in FIG. 3: In the perspective illustration of a section of the flange connection 1, the head 31c of another connection element can be seen in this case and is arranged in analogy to the head 31a of the connection element 30 (shown in FIG. 2); the connection element that is associated with the head 31c accordingly runs correspondingly. As can be inferred from the figure, a channel that crosses through the component 10 is arranged between two channels that are adjacent along the flange and cross through the component 20 and is offset with respect to them (namely in the component 10).

The heads 31a and 31c are each countersunk in respective countersinks 27a or 27c, which are separated from each other by a reinforcing crosspiece 28. The reinforcing crosspiece thus brings about a further increase in the shape stability of the flange connection. The two components with the channels and the respective connection elements passing through them are arranged in accordance with a glide reflection, with the support surface areas of the components constituting the mirror planes.

Figure 4:
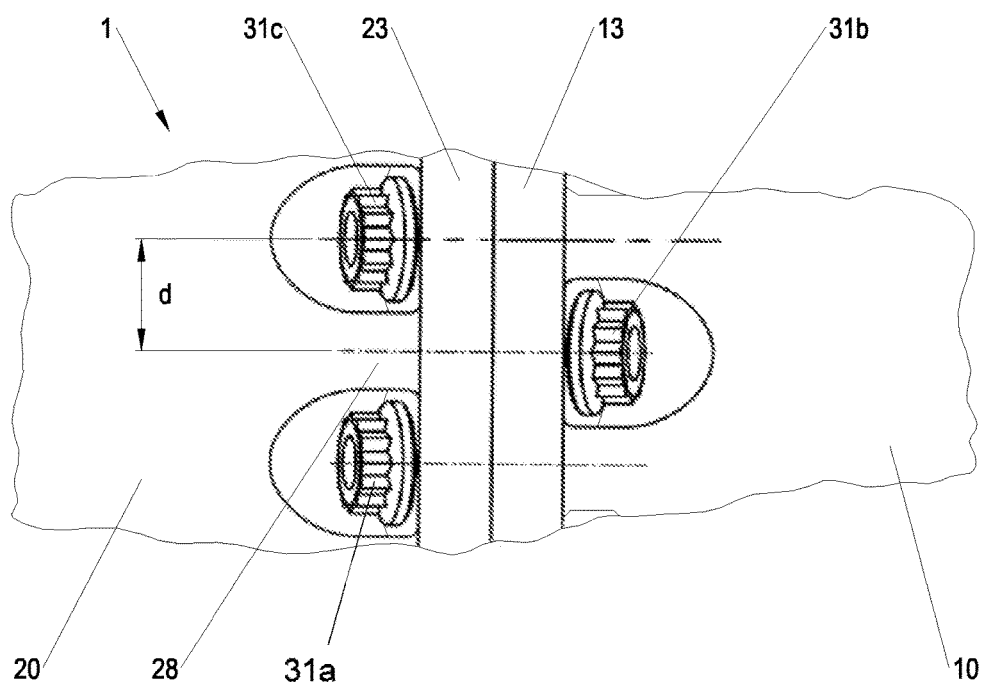
FIG. 4 is a section of the flange connection of FIG. 2 in plan view.

Seen in FIG. 4 is a section of the flange connection 1 in plan view. In this illustration, it can be seen that the configuration according to the invention of the components with oblique channels and the above-described pivoting thereof against each other makes possible a tight arrangement, that is, a short separation distance d of adjacent connection elements of the flange connection. As a result, it is possible to use a large number of connection elements and thus achieve a high shape stability.

Disclosed is a component 10, 20 with a component section 11, 21 and a flange 13, 23 that is arranged at the component section for connection of the component with another element. Arranged at the flange is one or a plurality of oblique flange channels 14, 24, that is, channels for respectively accommodating a section of a connection element 30 that runs obliquely to a surface portion 12, 22 of the component section 11, 21 that lies opposite to the flange. Further disclosed is a flange connection 1 with at least one component 10, 20 of this kind, another component, and at least one connection element 30. Disclosed, in addition, is a turbomachine with a housing that is assembled from two or more components by such a flange connection 1.

It would be appreciated by those skilled in the art that various changes and modifications can be made to the illustrated embodiments without departing from the spirit of the present invention. All such modifications and changes are intended to be covered by the appended claims.

What is claimed is:

1. A component having a component section and a flange arranged at the component section for connection of the component with at least one other element, wherein, at the flange, the component has at least one channel, each for accommodating a section of a connection element, and wherein the at least one channel runs obliquely to a surface portion of the component section that lies opposite to the flange,
   wherein the component has a first continuously concave surface and a second surface, opposite the first surface, being convex.

2. The component according to claim 1, wherein the at least one channel runs at an inclination to a support surface area of the component, which is configured and arranged to rest against a flange surface of the other element when the component is connected to another element.

3. The component according to claim 1, wherein the at least one channel runs at an inclination to a surface normal of a support surface area of the component and the surface normal of the support surface area runs perpendicularly to a surface normal of the surface portion.

4. The component according to claim 1, wherein the at least one channel runs perpendicularly to a support surface area of the component and a surface normal of the support surface area runs obliquely to the surface portion.

5. The component according to claim 1, wherein the at least one channel comprises at least two channels, which are each at different angles to said surface portion.

6. The component according to claim 1, wherein, at an opening, the at least one channel has a countersink for at least partial accommodation of a head of a connection element.

7. The component according to claim 6, wherein the at least one channel are at least two channels in which adjacent channels each have the countersink and a crosspiece formed between these countersinks.

8. The component according to claim 1, wherein the component is part of a divided housing of a hot-gas duct of a turbomachine, and is delimited radially outward, and/or is formed in one piece and integrally with the flange.

9. The component according to claim 1, wherein the at least one channel is formed as a blind hole with an entry and a channel end arranged in an interior of the component.

10. The component according to claim 1, wherein the at least one channels crosses through the component.

11. The component according to claim 10, wherein the at least one channel crosses through a center line of the component.

12. The component according to claim 1, wherein a flange connection includes at least two of the components, at least one of which has at least one channel, each for accommodating a section of at least one connection element, and wherein the at least one channel runs obliquely to a surface portion of the component section that lies opposite to the flange connection, as well as with the at least one connection element, a section of which is passed through or can be passed through the at least one channel to thereby fasten the components to one another.

13. The component according to claim 12, wherein the at least one connection element is configured and arranged as an expansion bolt.

14. The component according to claim 12, wherein a first component has at least one plurality of channels that crosses through the component and a second component has at least one channel that is formed as a blind hole with an entry and a channel end arranged in an interior of the component and wherein the at least one connection element is insertable through a channel crossing through the first component into a channel of the second component that is formed as a blind hole.

15. The component according to claim 12, wherein two components are formed with at least one plurality of channels crossing through the component and, wherein, between two channels that are adjacent along the flange connection and cross through a first of the components, a channel is arranged that is offset with respect thereto and crosses through the second of the components.

16. The component according to claim 12, wherein at least two of the components are secured by the flange connection in a turbomachine with a housing.

17. The component according to claim 12, wherein the first component and the second component includes complementary continuous concave surfaces.

18. The component according to claim 1, wherein the connection element is inserted tangentially to the surface portion of the component section that lies opposite to the flange.

* * * * *